No. 670,475. Patented Mar. 26, 1901.
J. B. ENTZ.
STORAGE BATTERY.
(Application filed July 9, 1900.)
(No Model.)
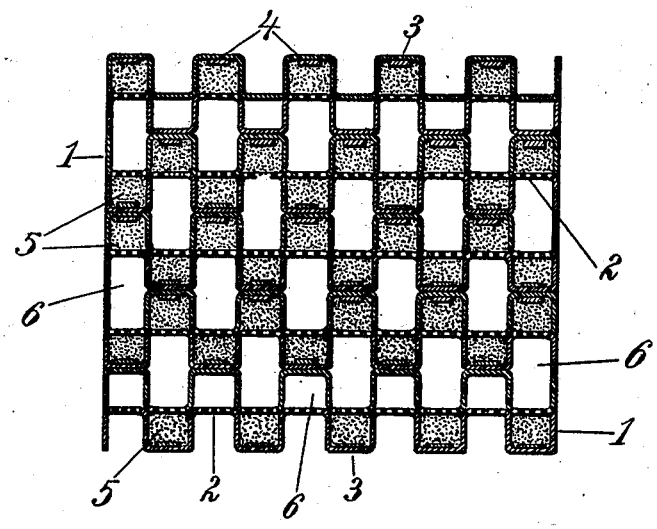
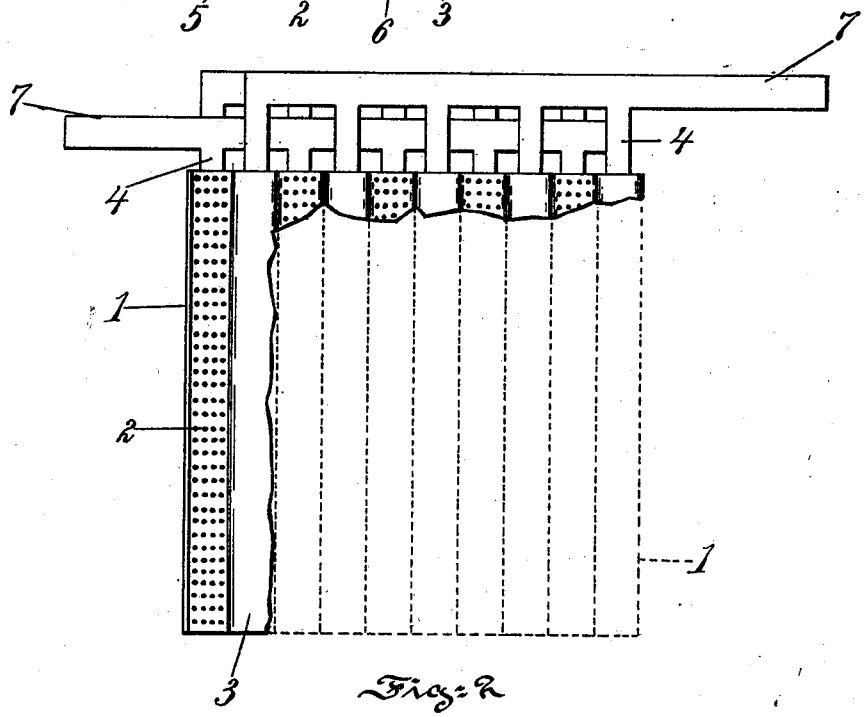
Witnesses:
Inventor:
Justus B. Entz,
By Augustus B. Stoughton
Attorney

UNITED STATES PATENT OFFICE.

JUSTUS B. ENTZ, OF PHILADELPHIA, PENNSYLVANIA, ASSIGNOR TO THE ELECTRIC STORAGE BATTERY COMPANY, OF SAME PLACE.

STORAGE BATTERY.

SPECIFICATION forming part of Letters Patent No. 670,475, dated March 26, 1901.

Application filed July 9, 1900. Serial No. 23,062. (No model.)

*To all whom it may concern:*

Be it known that I, JUSTUS B. ENTZ, a citizen of the United States, and a resident of Philadelphia, in the county of Philadelphia and State of Pennsylvania, have invented a certain new and useful Improvement in Storage Batteries, of which the following is a specification.

The object of this invention is to provide a battery of high electrical capacity in proportion to its weight; and to this and other ends the invention comprises the improvements hereinafter described and claimed.

The nature, characteristic features, and scope of the invention will be more fully understood from the following description, taken in connection with the accompanying drawings, forming part hereof, and in which—

Figure 1 is a sectional view illustrating a number of plates of my invention arranged as they would be mounted in a tank or jar; and Fig. 2 is a side elevational view of the same, in which certain portions are shown by dotted lines in order to simplify the drawings.

In the drawings, 1 is a fluted separator-support, and the alternate flutes are perforated, as at 2, and the intermediate flutes are imperforate, as at 3. These separator-supports may be made of sheets of hard rubber. The conductors 4 are mounted in the imperforate flutes, and these flutes are filled with active material or material to become active, 5, for example, by pasting the separator-support flush with its surface with such material. A number of the described separator-supports, in which the imperforate plates contain the active material and the conductor, are placed together and face to face in such manner that the perforated flutes of one cover the active material of the adjoining one. A pair of such separators put together constitute a plate of one polarity. The plate of the other polarity is placed right up against this pair, and the portions of both separators which are not perforated come directly together and obviate any possibility of short-circuiting. The intermediate spaces or empty flutes 6 constitute wells for the electrolyte, and on the opposite sides of these wells lie the perforated flutes back of which is the active material 5, the positive being on one side of the well and the negative on the other. The conductors 4, of like polarity, may be made part of or connected with suitable leads 7, which in turn may be properly connected together and used as the terminals of the cell.

It will be obvious to those skilled in the art to which the invention appertains that modifications may be made in details without departing from the spirit thereof. Hence I do not limit myself to the precise construction and arrangement of parts herein set forth, and shown in the drawings; but,

Having thus described the nature and objects of my invention, what I claim as new, and desire to secure by Letters Patent, is—

1. A combined separator and support consisting of a fluted sheet of non-conducting material having its alternate flutes perforated and its intermediate flutes imperforate, substantially as described.

2. A battery-plate consisting of a combined separator and support comprising a fluted sheet having its alternate flutes perforated and its intermediate flutes imperforate, active material or material adapted to become active contained within the imperforate flutes, and a conductor extending into the active material, substantially as described.

3. A secondary or storage battery consisting of a series of fluted sheets whereof alternate flutes are perforated and intermediate flutes are imperforate arranged in such manner that the imperforate flutes abut, active material or material adapted to become active located in the imperforate flutes of one sheet and held to place by the perforated flute of the adjoining sheet, conductors extending into the active material, and electrolyte contained in the wells bounded by the perforated flutes of adjacent sheets, substantially as described.

JUSTUS B. ENTZ.

Witnesses:
W. J. JACKSON,
K. M. GILLIGAN.